United States Patent [19]

Kelley

[11] Patent Number: 5,675,822

[45] Date of Patent: Oct. 7, 1997

[54] METHOD AND APPARATUS FOR A DIGITAL SIGNAL PROCESSOR HAVING A MULTIPLIERLESS COMPUTATION BLOCK

[75] Inventor: Brian T. Kelley, Austin, Tex.

[73] Assignee: Motorola Inc., Schaumburg, Ill.

[21] Appl. No.: 418,346

[22] Filed: Apr. 7, 1995

[51] Int. Cl.[6] ......................................... G06F 7/38
[52] U.S. Cl. .................. 395/800; 364/748.5; 364/228.6; 364/232.8; 364/258.2; 364/DIG. 1
[58] Field of Search ..................... 395/800, 775; 364/722, 736, 741, 748.5, 750.5, 754, 761, 768

[56] References Cited

U.S. PATENT DOCUMENTS

| | | | |
|---|---|---|---|
| 5,109,524 | 4/1992 | Wagner et al. | 395/800 |
| 5,331,582 | 7/1994 | Sudo et al. | 364/722 |
| 5,337,266 | 8/1994 | Arnold | 364/748.5 |
| 5,359,551 | 10/1994 | Pickett | 364/718 |
| 5,365,465 | 11/1994 | Larson | 364/715.03 |
| 5,553,012 | 9/1996 | Buss et al. | 364/722 |

OTHER PUBLICATIONS

Motorola, Inc.; "DSP56100 Digital Signal Processor Family Manual"; 1993.

Primary Examiner—Alpesh M. Shah

[57] ABSTRACT

A digital signal processor having a multiplierless computation block (140) is accomplished by storing approximations of computed logarithms in memory (160, 162). When two pieces of data (114, 116) are received, the approximate logarithms, or logarithmic data (120, 128), for each of the pieces data are retrieved from memory. The logarithmic data (120, 128) is them summed to produce a resultant (136), wherein the resultant (136) is used to retrieve an inverse logarithmic approximation (180) that is stored in memory (170, 172) in a manner similar to that of the logarithmic approximations. The inverse logarithmic approximation (180) that results closely approximates the product of multiplying, or another arithmetic function, the two pieces of data (114, 116).

28 Claims, 8 Drawing Sheets

METHOD AND APPARATUS FOR A DIGITAL SIGNAL PROCESSOR HAVING A MULTIPLIERLESS COMPUTATION BLOCK

FIELD OF THE INVENTION

This invention relates generally to circuits and in particular to a method and apparatus for a digital signal processor having a multiplierless computation block.

BACKGROUND OF THE INVENTION

Digital signal processors (DSPs) are commonly used to perform real-time computationally intensive data processing applications. Common features of DSP architectures include an arithmetic logic unit that implements a multiply-and-accumulate operation, an address generation unit that implements modulo addressing, program and data memory, and other application dependent peripheral blocks.

Some applications that use the real-time processing capabilities of DSPs include modems, digital audio equipment, and digital cellular communications systems. In digital cellular communications systems, DSPs are often employed to process digital audio signals resulting from the sampling of analog speech. These digital cellular systems require the analog speech signals to be digitally coded in a manner that reduces the required bandwidth of the analog speech signal and minimizes the susceptibility of the digitally encoded speech to noise. Many current digital cellular communication systems employ speech coding algorithms known as Vector Sum Excited Linear Prediction (VSELP) to satisfy these requirements. VSELP speech encoders incorporate a number of different routines that extract different speech parameters. DSP systems are used to execute these routines, as they are able to do so within the real-time constraints imposed on the system.

One of the more computational intensive routines within the VSELP speech encoding process is lag-searching, or pitch-prediction. The lag-search routines, or operations, extract the underlying pitch of speech data. In order to determine the optimal lag value, a great deal of data processing is required that consumes a large percentage of the bandwidth, or processing power, of current DSP systems. While a DSP system is performing the lag-search pitch-prediction operations, little processing power is left over to accommodate other needs of the system.

Cellular systems which employ VSELP speech coding are self-contained and battery-powered, and therefore minimizing power consumption in order to maximize "talk-time" is of great importance. DSP systems that provide the required bandwidth to support all of the routines required for VSELP speech encoding consume a relatively large amount of power in cellular systems, thus reducing operating efficiency and battery life.

Therefore, a need exists for a method and apparatus that can off-load some of the data processing requirements of a DSP in such a way that power consumption is reduced with minimal increase in circuit complexity or size.

DETAILED DESCRIPTION OF THE DRAWINGS

Generally, the present invention provides a method and apparatus for a multiplierless computation block that can be used in a digital signal processor (DSP) core processor or in a DSP co-processor. The multiplierless computation block is accomplished by storing approximations of computed logarithms in memory. When two pieces of data are received, the approximate logarithms, or logarithmic data, for each of the pieces data are retrieved from memory. The logarithmic data is then summed to produce a resultant, wherein the resultant is used to retrieve an inverse logarithmic approximation that is stored in memory in a manner similar to that of the logarithmic approximations. The inverse logarithmic approximation that results approximates the product of multiplying the two pieces of data. This multiplication product is achieved without the complex circuitry normally required to perform multiplication operations. Using the multiplierless computation block, calculation intensive algorithms such as lag-search can be accomplished in a pipelined fashion that is able to maximize throughput. With such a method and apparatus, computationally intensive routines, such as lag-search, can be off-loaded onto the multiplierless computation block, or a co-processor containing the multiplierless computation block. With the computationally intensive routines being executed elsewhere, the DSP core processor can enter a low-power state, thus conserving power, or can be used to perform other tasks.

Figure 1:
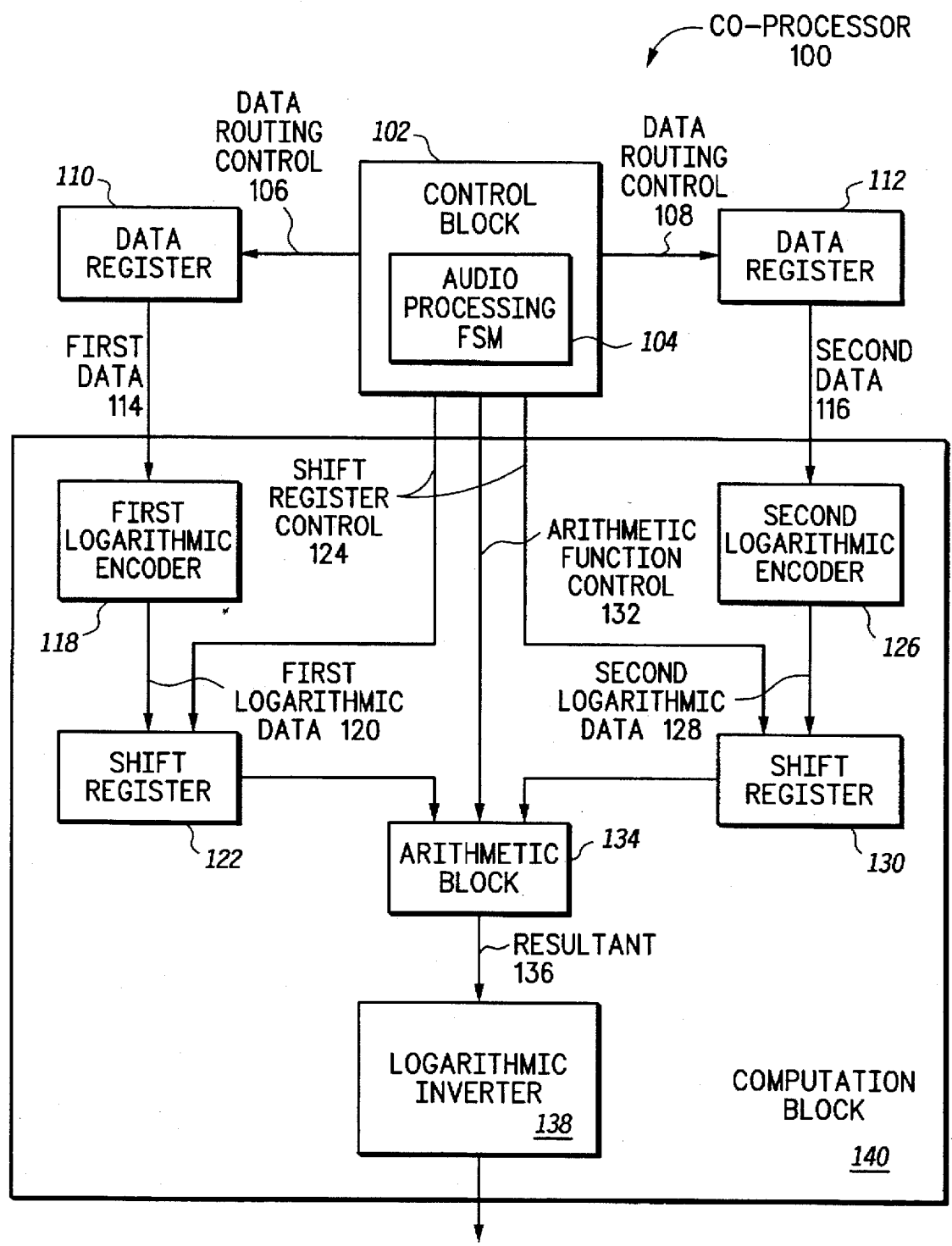
FIG. 1 illustrates, in a block diagram, a co-processor in accordance with the present invention.

FIG. 1 illustrates a co-processor 100 which may be used for off-loading complex computation operations from a DSP core processor. The co-processor includes a control block 102, and a computation block 140. The computation block 140 performs computations under the control of the control block 102, which may include an audio-processing Finite State Machine (FSM) 104, or a processor that executes audio processing microcode stored in memory. This microcode may include lag-search pitch-prediction routines or other signal processing routines.

The computation block 140 includes a first logarithmic encoder 118, a second logarithmic encoder 126, shift registers 122 and 130, an arithmetic block 134, and a logarithmic inverter 138. The control block 102 asserts the data routing control signals 106 and 108, enabling the data registers 110 and 112 to provide first data 114 and second data 116 to the computation block 140. First logarithmic encoder 118 performs a first logarithmic approximation on first data 114 to produce first logarithmic data 120, and second logarithmic encoder 126 performs a second logarithmic approximation on second data 116 to produce second logarithmic data 128. The logarithmic approximations are accomplished using a memory-lookup scheme illustrated in FIG. 2, which will be discussed below.

The shift registers 122 and 130 receive the first logarithmic data 120 and the second logarithmic data 128, respectively, and are able to perform bit-wise shifts on the first logarithmic data 120 and the second logarithmic data 128. These bit-wise shifts are controlled by the shift register control signals 124 from the control block 102. For example, if the first logarithmic data 120 is a base-two logarithmic approximation of the first data 114, the shift register 122 can be used to shift the bits in the first logarithmic data 120, which is equivalent to finding the approximate square or square root of the first data 114 used to generate the logarithmic data. Continuing with the example, if the base-two logarithm of a number is calculated, the resulting logarithm is logically bit-shifted left, and the inverse logarithm of the logarithm is calculated, the result will be the square of the original number. Likewise, if the logarithm is logically bit-shifted right, the result of calculating the inverse logarithm will be the square-root of the original number.

The arithmetic block 134 combines the first logarithmic data 120 and the second logarithmic data 128 to produce a resultant 136, where the resultant 136 approximates an arithmetic function performed on the first data 114 and the second data 116. This is realized when the logarithmic inverter 138, which is further detailed in FIG. 3, performs an inverse-logarithmic approximation on the resultant 136. If the arithmetic block 134 adds the first logarithmic data 120 and the second logarithmic data 128 (and no shifting occurs in the shift registers 122 and 130), the inverse-logarithmic approximation will approximate the product of multiplying the first data 114 and the second data 116. Similarly, if the arithmetic block 134 subtracts the second logarithmic data 120 from the first logarithmic data 128, the inverse-logarithmic approximation will approximate the quotient of dividing the first data 114 by the second data 116.

The circuitry required to implement the addition and subtraction functions of the arithmetic block 134 is much simpler than that normally required to implement typical multiplication and division circuits, thus conserving a great deal of die area. In addition, because the operation of the computation block is very specific, the block can be pipelined in such a way to maximize throughput and increase the speed at which the computations can be performed. As illustrated above, the arithmetic block 134 can perform a number of different arithmetic functions which the control block 102 can specify via the arithmetic function control signal 132.

Figure 2A:
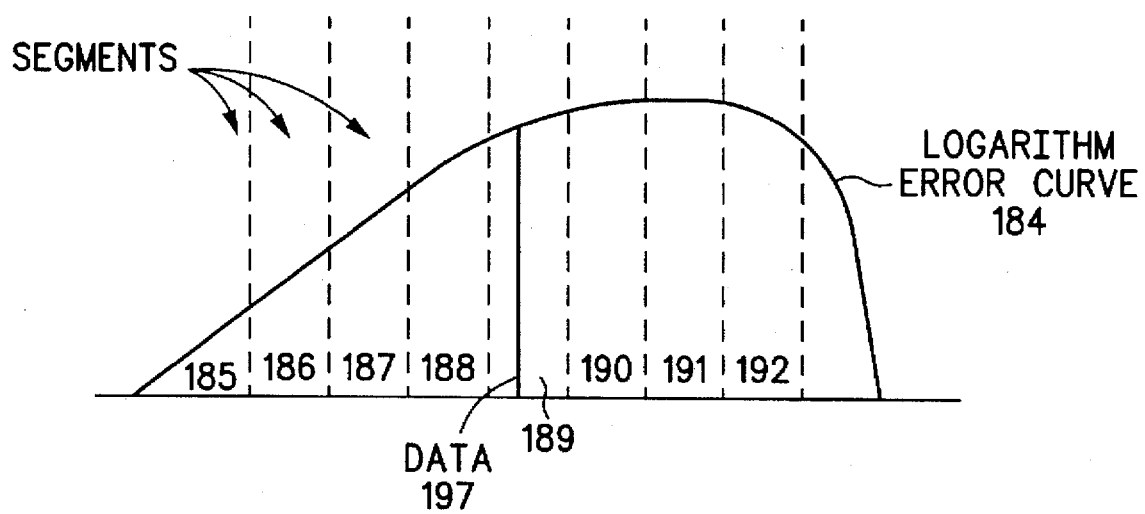
FIG. 2 illustrates a plot of a logarithmic error curve in accordance with the present invention.
Figure 2B:
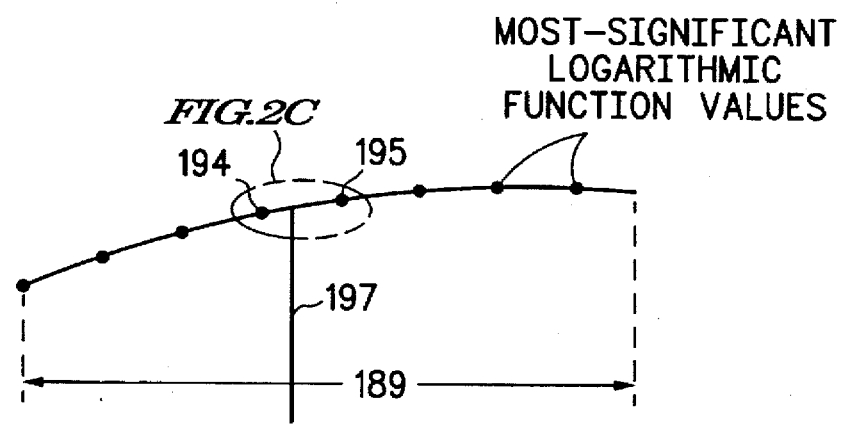
Figure 2C:
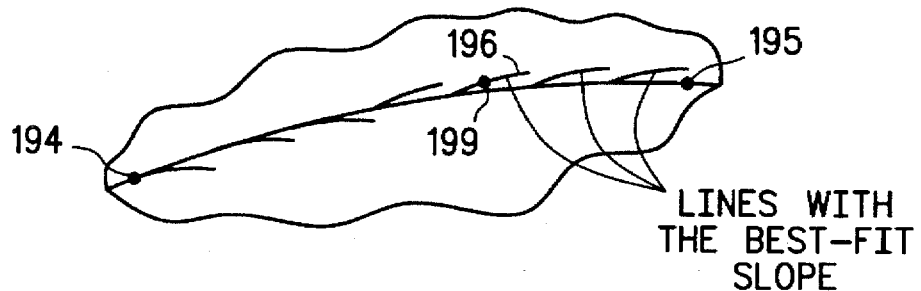

FIG. 2 illustrates the curves used by the logarithmic encoders 118 and 126 to determine the logarithmic data 120 and 128 from the data 114 and 116. The logarithm error curve 184 plots the value of "log(x)–x" over a specified range, where "x" represents the data for which the logarithm is being approximated. This curve is used rather than the basic logarithm curve, "log(x)", as it can be accurately approximated with much less memory than would be required to approximate the log(x) curve. The data 197 is mapped onto the logarithm error curve 184 with two values, a most-significant logarithmic function value and a least-significant logarithmic function approximation.

The logarithm error curve 184 is divided into eight segments 185–192. Each of the segments 185–192 contains eight most-significant logarithmic function values, which are points that lie on the logarithmic error curve 184, and accurately represent the value of the curve 184 at those points. Thus, the first, or most-significant, portion of mapping to the curve 184 is one of these points. As is illustrated, the data 197 lies between two most-significant logarithmic function values 194 and 195. A simple approximation of the value of the curve 184 between the two points is a line connecting the most-significant logarithmic function values 194 and 195. A more accurate approximation can be achieved by optimally choosing the slope of a line which best fits the curve 184 over one of the segments 185–192. In other words, for each segment, a line that best fits the curve over that particular segment is determined and used for interpreting values between the most-significant logarithmic function values within that particular segment. The curve 184 is divided into lines of this predetermined slope between two adjacent most-significant logarithmic function values, where each line gives a good approximation for the curve 184 over the distance it covers. Note that a best-fit curve, rather than a best-fit line, may be used to achieve a more accurate approximation to the curve 184 between two adjacent most-significant logarithmic function values.

The second, or least-significant, portion of the mapping to the curve 184 is one of these lines, and further a position somewhere on that line. For the data 197, the point 199 on the line 196 provides this least-significant portion of the mapping. The most-significant portion of the mapping, which is directly on the curve, is referred to as a most-significant logarithmic function value. The least-significant portion of the mapping, which is an approximation of the curve 184 between two most-significant mapping points, is referred to as a least-significant logarithmic function approximation. As one skilled in the art will readily appreciate, the curve 184 may be divided into more or fewer segments.

Figure 3:
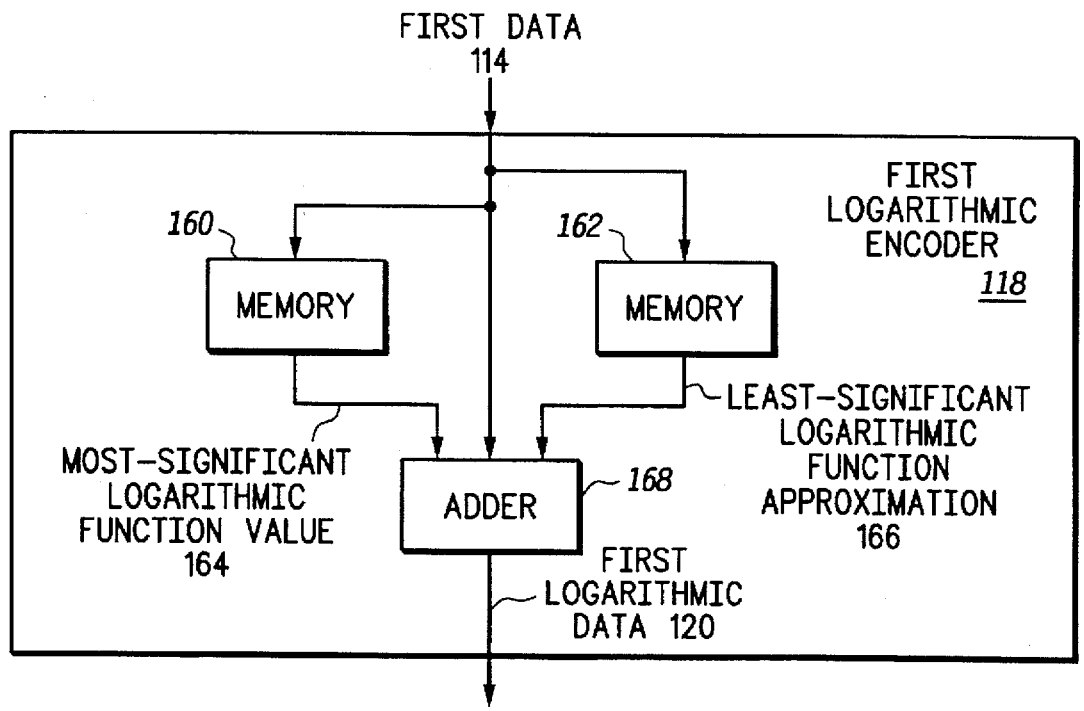
FIG. 3 illustrates, in a block diagram, a logarithmic encoder in accordance with the present invention.

FIG. 3 illustrates a first logarithmic encoder 118 that includes memory blocks 160, 162 and adder 168. The second logarithmic encoder 126 functions in a similar manner to the first logarithmic encoder 118, which has been illustrated for clarity of description. Memory 160 stores most-significant logarithmic function values, and memory 162 stores least-significant logarithmic function approximations. A portion of first data 114 is used to address the memory 160 to retrieve the most-significant logarithmic function value 164. Another portion of the first data 114 is used to address the second memory 162 to retrieve a least-significant logarithmic function approximation 166. The combination of the most-significant logarithmic function value 164 and the least-significant logarithmic function approximation 166 map the first data 114 to the logarithmic error curve 184.

The adder 168 adds the first data 114 to the combination of the most-significant logarithmic function value 164 and the least-significant logarithmic function approximation 166 to produce the first logarithmic data 120. The mapping to the logarithmic error curve 184 results in "log(x)–x", where "x" is equal to the first data 114. By adding the first data 114 to this value, the resulting first logarithmic data 120 is approximately equal to "log(x)", where a slight amount of error is introduced by the least-significant logarithmic function approximation 166. The amount of error is dependent on the size of the memory 162 used to approximate the logarithmic error curve 184 between most-significant logarithmic function values stored in the memory 160. Note that the size of the memory 160 can also be increased to reduce the error, as a larger memory will allow more points on the logarithmic error curve 184 to be stored, thus reducing the distance between points where the logarithmic error curve 184 must be approximated.

In other embodiments, a different logarithmic error curve or a true logarithmic mapping curve may be stored in the two memories, rather than the particular error curve shown (i.e. store approximations to the curve "log(x)" rather than "log (x)–x".). In such a system, the adder would not be required add the first data 114 in order to produce the first logarithmic data 120. Another possible embodiment may calculate the logarithm of the first data 114 rather than use memory lookup tables to approximate the logarithmic values.

Figure 4:
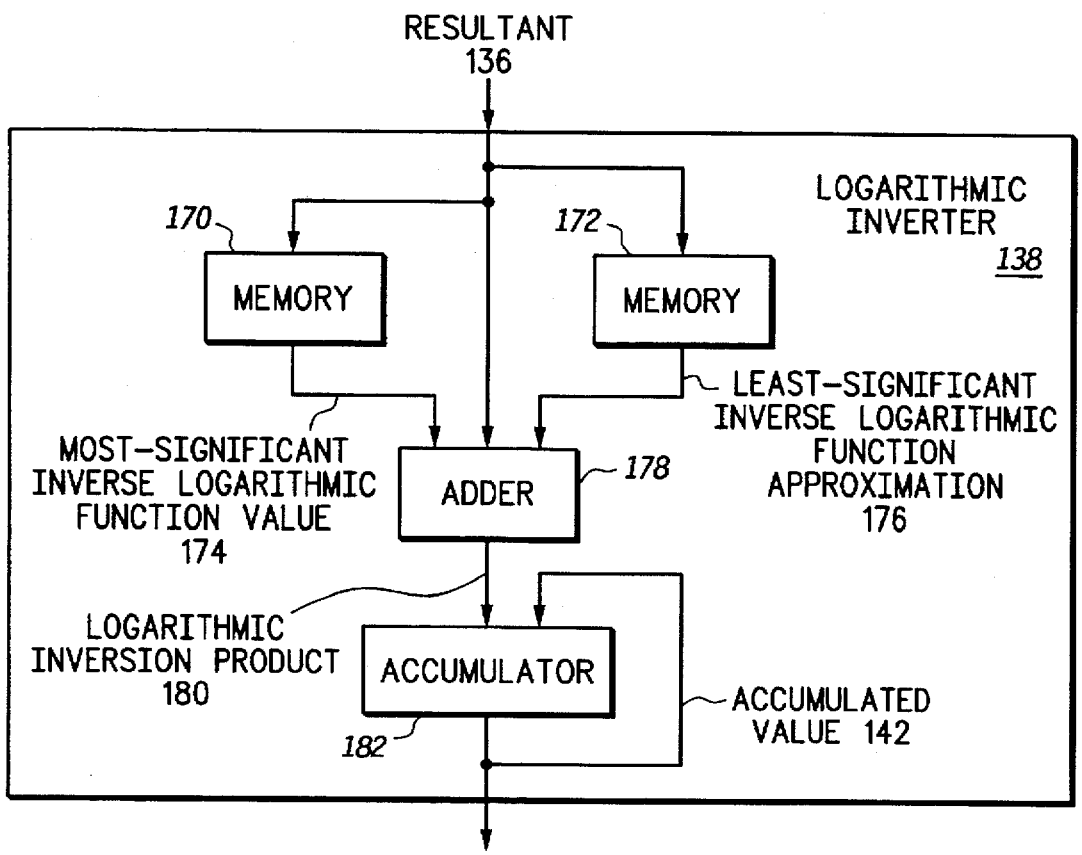
FIG. 4 illustrates, in a block diagram, a logarithmic inverter in accordance with the present invention.

FIG. 4 illustrates the logarithmic inverter 138 which includes memory blocks 170 and 172, an adder 178 and an accumulator 182. In a similar fashion to the first logarithmic encoder 118 discussed above, the memory blocks 170 and 172 store logarithmic inversion approximations, where memory 170 stores most-significant inverse logarithmic function values and memory 172 stores least-significant inverse logarithmic function approximations. These two values combine to map the resultant 136 to an inverse logarithmic error curve, wherein the least-significant inverse logarithmic function approximations approximate the value of the curve between the points defined by the most-significant inverse logarithmic function values.

A portion of resultant 136 is used to address the memory 172 to retrieve the most-significant inverse logarithmic function value 174. Another portion of the resultant 136 is used to address a second memory 172 to retrieve a least-significant inverse logarithmic function approximation 176. The combination of the most-significant inverse logarithmic function value 174 and the least-significant inverse logarithmic function approximation 176 map the resultant 136 to an inverse logarithmic error curve.

The adder 178 adds the resultant 136 to the combination of the most-significant inverse logarithmic function value 174 and the least-significant inverse logarithmic function approximation 176 to produce logarithmic inversion product 180. The mapping to the inverse logarithmic error curve results in "$\log^{-1}(x)-x$", where "x" is equal to the resultant 136. By adding the resultant 136 to this value, the resulting logarithmic inversion product 180 is approximately equal to "$\log^{-1}(x)$", where a slight amount of error is introduced by least-significant inverse logarithmic function approximation 176. The amount of error is dependent on the size of the memory 172 used to approximate the inverse logarithmic error curve between most-significant inverse logarithmic function values stored in the memory 170. Note that the size of the memory 170 can also be increased to reduce the error, as a larger memory will allow more points on the inverse logarithmic error curve 184 to be stored, thus reducing the distance between points where the logarithmic error curve 184 must be approximated.

In other embodiments, a true inverse logarithmic mapping curve may be stored in the two memories, rather than an error curve (i.e. store approximations to the curve "$\log^{-1}(x)$" rather than "$\log^{-1}(x)-x$".). In such a system, the adder would not be required to add the resultant 136 in order to produce the logarithmic inversion product 180. Another possible embodiment may calculate the inverse logarithm of the resultant 136 rather than use memory lookup tables to approximate the inverse logarithmic values.

The accumulator 182 adds the logarithmic inversion product 180 to an accumulated value 142, thus enabling the computation block 140 to perform multiply-and-accumulate functions that are often required in DSP systems.

Figure 5:
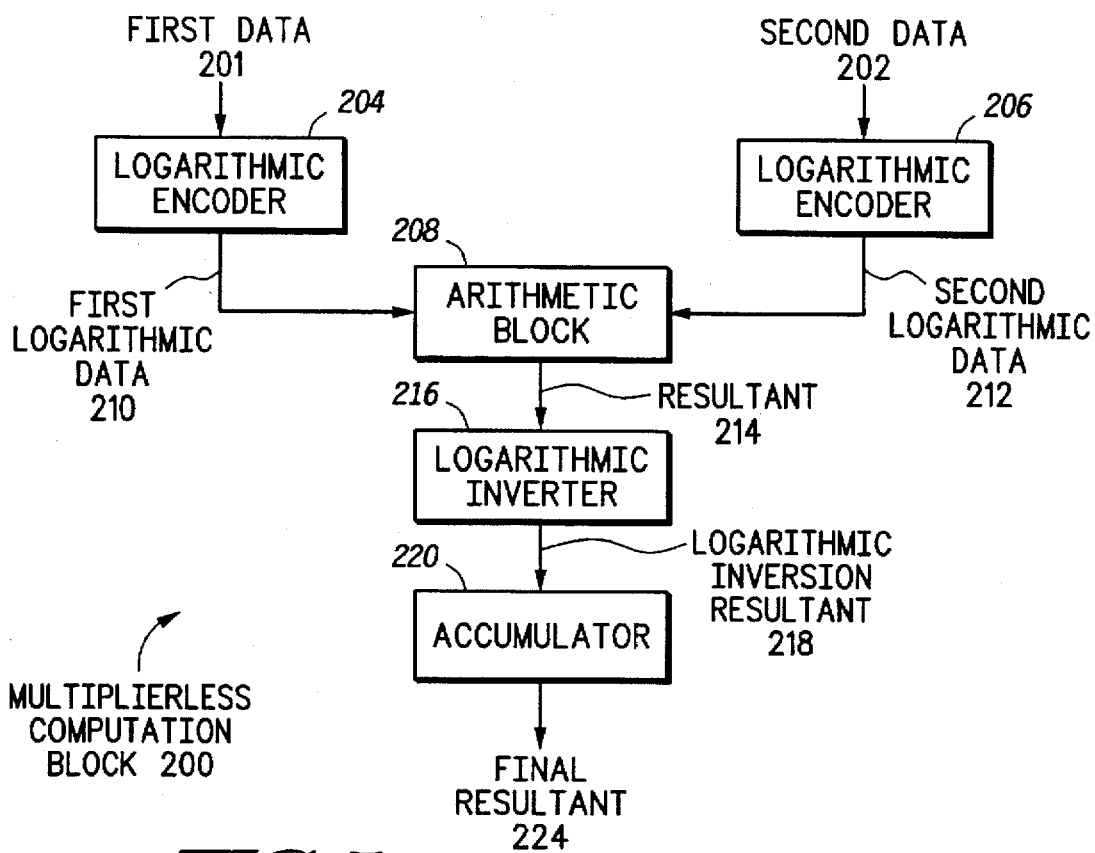
FIG. 5 illustrates, in a block diagram, a multiplierless computation block in accordance with the present invention.

FIG. 5 illustrates a multiplierless computation block that includes logarithmic encoders 204 and 206, arithmetic block 208, logarithmic inverter 216, and accumulator 220. Logarithmic encoder 204 performs a first logarithmic approximation on first data 201 to produce first logarithmic data 210, and logarithmic encoder 206 performs a second logarithmic approximation on second data 202 to produce second logarithmic data 212. The logarithmic encoders 204 and 206 are similar to first logarithmic encoder 118 of FIG. 3 which was detailed above.

Arithmetic block 208 combines the first logarithmic data 210 and the second logarithmic data 212 to produce a resultant 214 that approximates an arithmetic function performed on the first data 201 and the second data 202. The arithmetic function may be a multiply, in which case the arithmetic block 208 would add the first data 201 and the second data 202, or the function may be a divide, in which case either the first data 201 or the second data 202 would be subtracted from the other.

The logarithmic inverter 216 performs an inverse-logarithmic approximation on the resultant 214 to a produce logarithmic inversion resultant 218. The logarithmic inverter 216 is similar to the logarithmic inverter 138 that was detailed above. The accumulator 220 adds the logarithmic inversion resultant 218 to previously accumulated results to produce a final resultant 224. The accumulator 220 enables the multiplierless computation block 200 to perform functions such as multiply-and-accumulate, divide-and-accumulate, etc.

Figure 6:
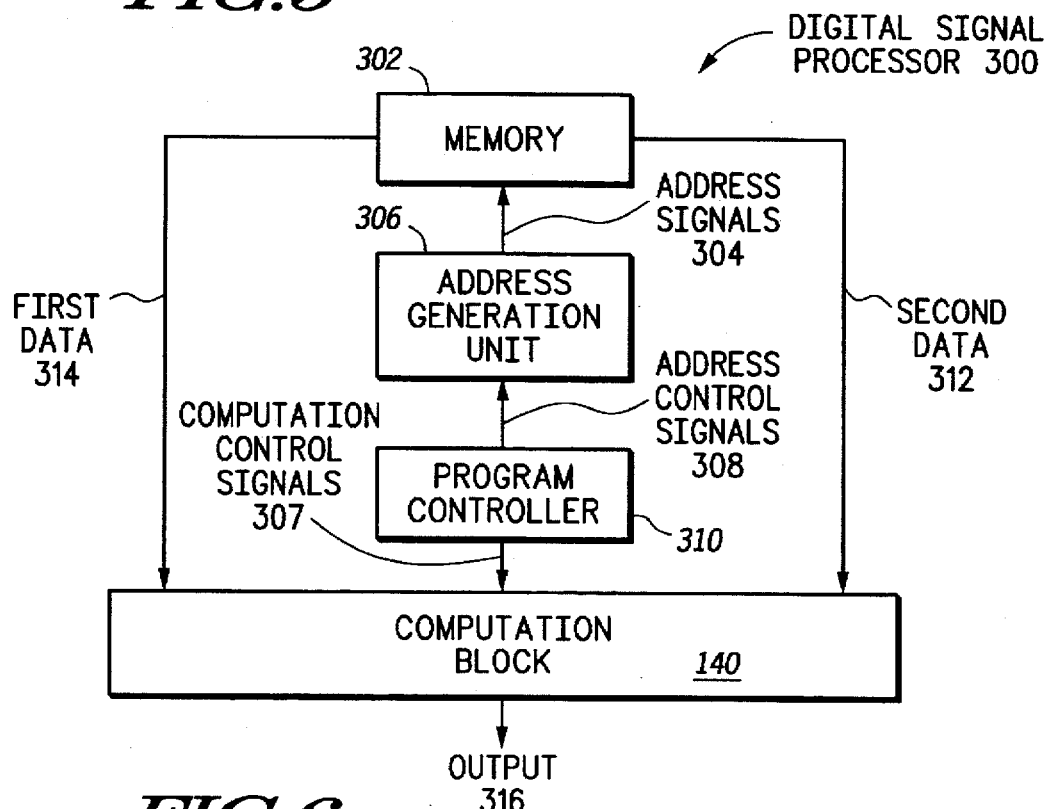
FIG. 6 illustrates, in a block diagram, a digital signal processor in accordance with the present invention.

FIG. 6 illustrates a digital signal processor 300 that includes a program controller 310, an address generation unit 306, memory 302, and a multiplierless computation block 140. The program controller 310 produces a plurality of control signals, including address control signals 308 and computation control signals 307. The control signals are generated by the program controller 310 to control execution of an algorithm, which may be a lag-search or another DSP algorithm. The address generation unit 306 generates address signals 304 based on the address control signals 308. The address signals 304 are used to retrieve the first data 314 and the second data 312 from the memory 302.

The computation block 140 receives the first data 314 and the second data 312 and performs the arithmetic operation defined by the computation control signals 307 on the first data 314 and the second data 312 to produce an output 316. The functionality of the computation block 140, which is illustrated in FIG. 1, is discussed in detail above.

Figure 7:
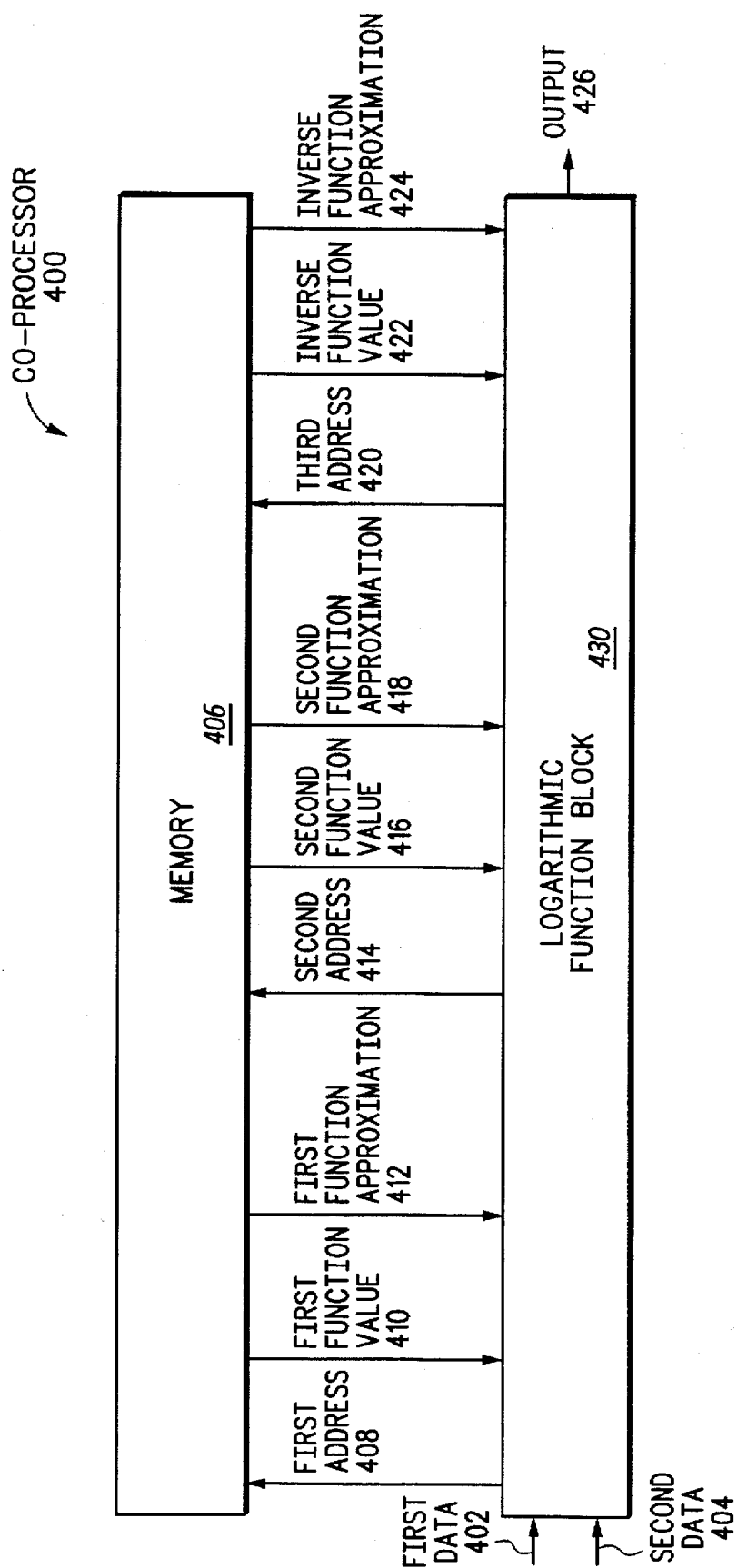
FIG. 7 illustrates, in a block diagram, a co-processor in accordance with the present invention.

FIG. 7 illustrates an alternative embodiment of a co-processor 400 that can be used to off-load computational intensive operations from a DSP system in order to conserve power and improve performance. The coprocessor 400 includes a memory 406 and a logarithmic function block 430. The memory 406 stores most-significant logarithmic function values and least-significant logarithmic function approximations which approximate a logarithmic error curve in a similar manner to those stored in memory blocks 160 and 162 of FIG. 3. Also stored in the memory 406 are most-significant inverse logarithmic function values and least-significant inverse logarithmic function approximations which approximate an inverse-logarithmic error curve in a similar manner to those stored in memory blocks 170 and 172 of FIG. 4.

The logarithmic function block 430 receives first data 402 and uses it to generate a first address 408 which addresses the memory 406 to retrieve a first most-significant logarithmic function value, or first function value 410, and a second least-significant logarithmic function approximation, or first function approximation 412. When combined, the first function value 410 and the first function approximation 412 approximate the logarithm of the first data 402. In a similar manner, the logarithmic function block 430 receives second data 404 and uses it to generate a second address 414 which retrieves a second function value 416 and a second function approximation 418 from the memory 406.

The logarithmic function block 430 processes the first data 402, the second data 404, the first function value 410, the first function approximation 412, the second function value 416, and the second function approximation 418 to perform an arithmetic function thereby producing a resultant. The logarithmic function block 430 may perform an addition, a subtraction, combinations of additions and subtractions, or other arithmetic operations.

The resultant is used by the logarithmic function block 430 to produce a third address 420 for an inverse logarithmic function. The third address 420 addresses the memory 406 to retrieve one of the most-significant inverse logarithmic function values (inverse function value 422) and one of the least-significant inverse logarithmic function approximations (inverse function approximation 424). The inverse function value 422 and the inverse function approximation 424 are combined with the resultant in the logarithmic function block 430 to produce the inverse logarithmic function which results in the output 426 being an arithmetic function of the first data 402 and the second data 404. In other words, the logarithmic function block 430 can be configured such that the output 426 is an approximation of the product of the first data 402 and the second data 404 without the use of a multiplication block.

Figure 8:
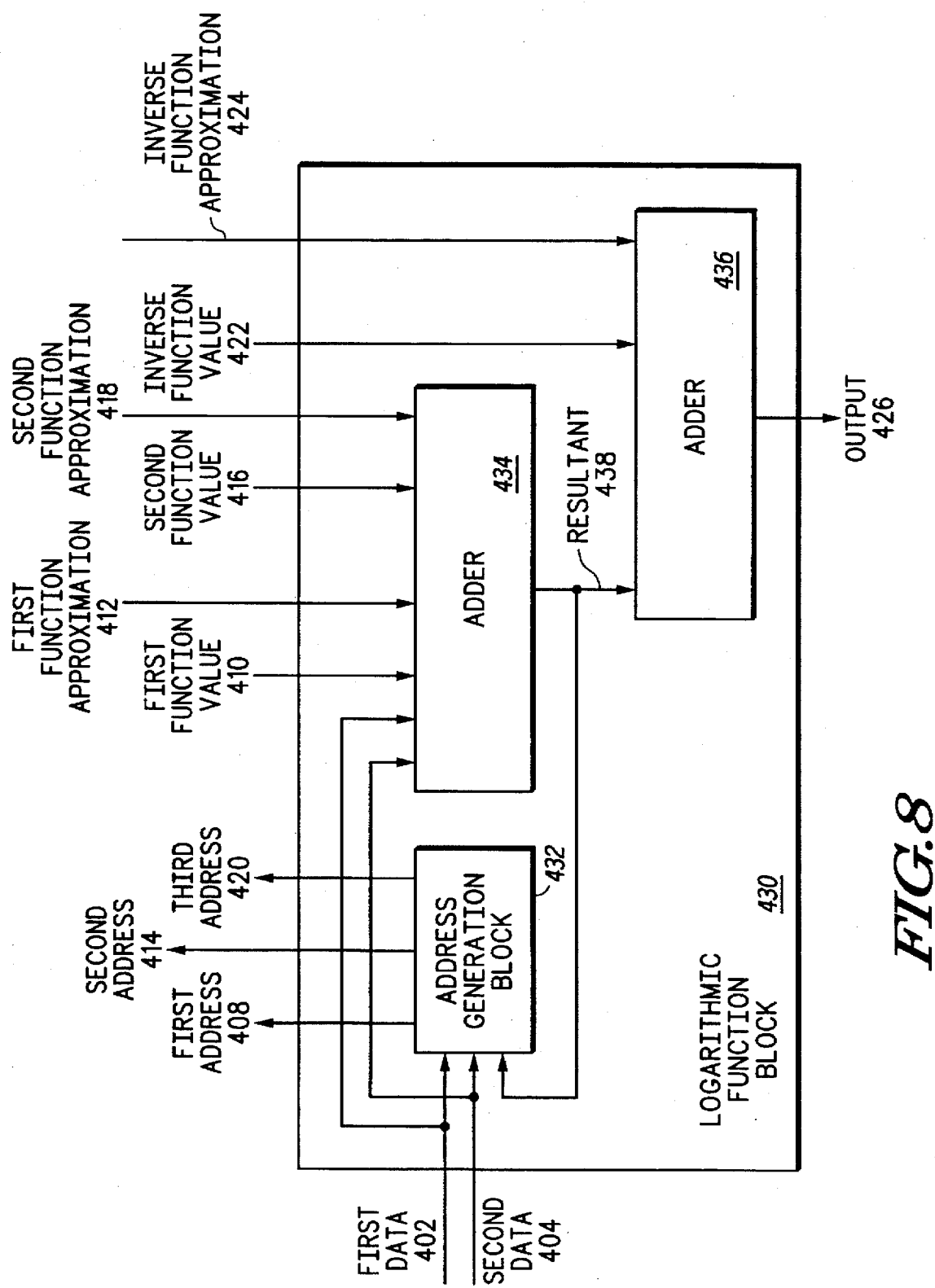
FIG. 8 illustrates, in a block diagram, a logarithmic function block in accordance with the present invention.

FIG. 8 illustrates an embodiment of the logarithmic function block 430. The logarithmic function block 430 includes an address generation block 432, and two adders 434 and 436. The address generation block 432 receives the first data 402, the second data 404, and the resultant 438, and produces the first address 408, the second address 414 and the third address 420 based on the first data 402, the second data 404, and the resultant 438, respectively.

The adder 434 combines the first data 402, the second data 404, the first function value 410, the first function approximation 412, the second function value 416, and the second function approximation 418 to produce the resultant 438. If the arithmetic function to be performed by the logarithmic function block 430 on the first data 402 and the second data 404 is a multiply function, the values of these signals will be added. For other arithmetic functions performed by the logarithmic function block 430, different combinations of additions and subtractions will occur in the adder 434.

The adder 436 combines the resultant 438 with the inverse function value 422 an the inverse function approximation 424 to produce the inverse logarithmic function which results in the output 426. If the inverse function value 422 and the inverse function approximation 424 represent the value of "log$^{-1}$(x)–x", where "x" represents the value of the resultant 438, the resultant 438 is added to the inverse function value 422 and the inverse function approximation 424 to produce "log$^{-1}$(x)". Thus, the output 426 produced is an approximation to an arithmetic function performed on the first data 402 and the second data 404.

Figure 9A:
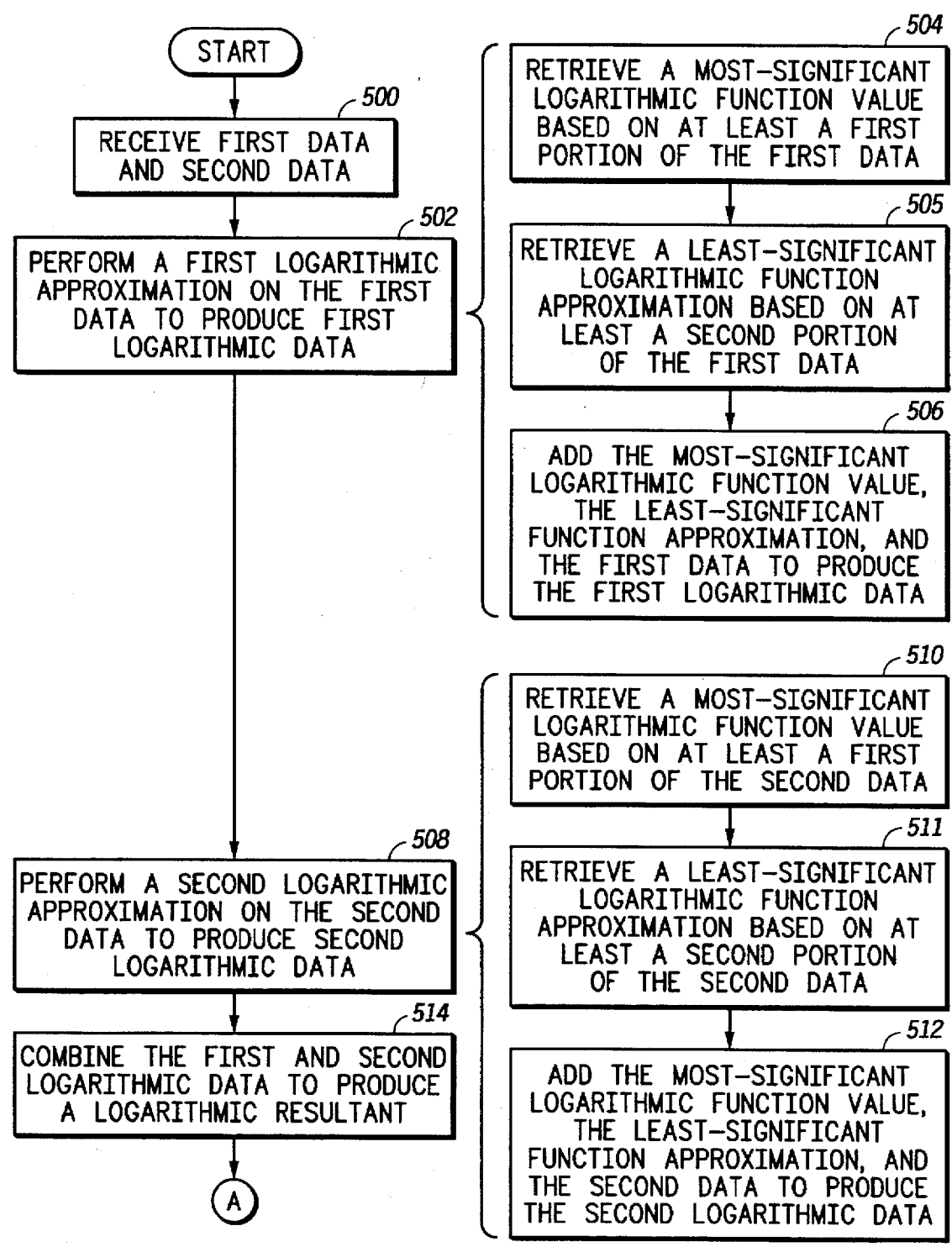
FIG 9 illustrates, in a logic diagram, a method for processing data in accordance with the present invention.
Figure 9B:
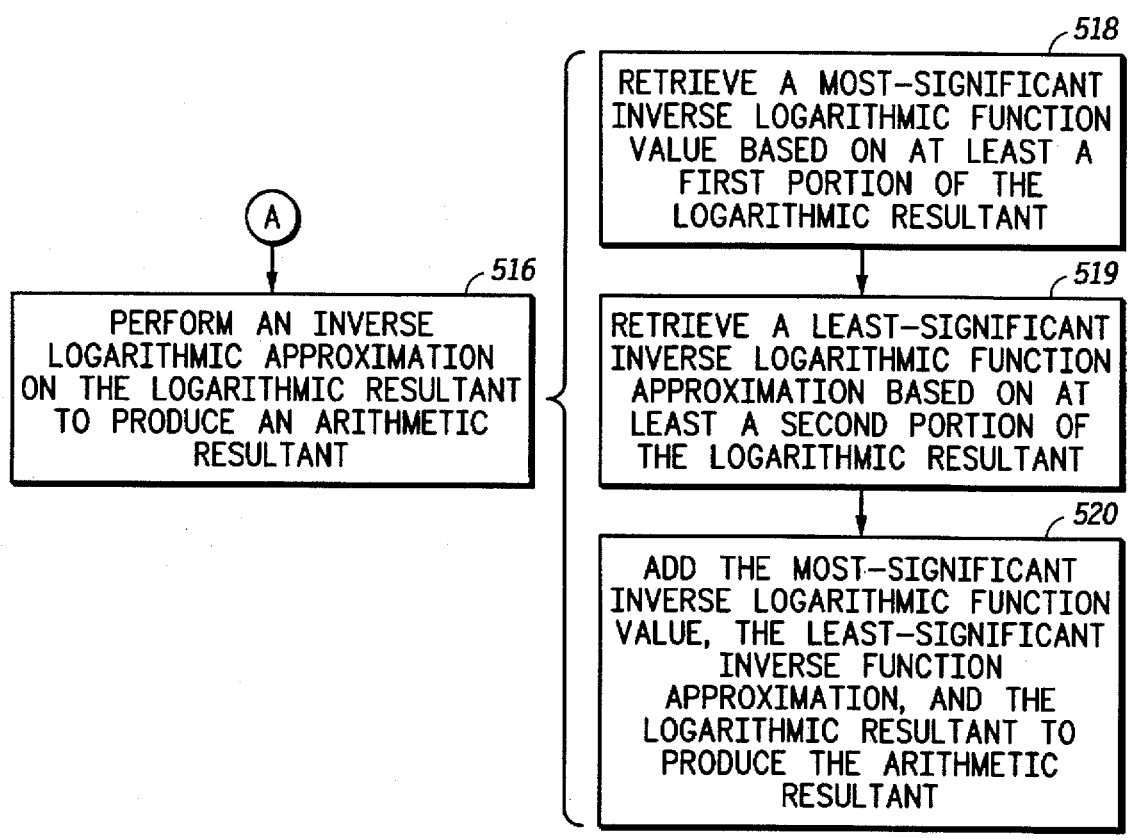

FIG. 9 illustrates a method for processing data, where arithmetic functions on the data are performed in a manner that conserves power and increases throughput. At step 500 first and second data are received. At step 502, a first logarithmic approximation is performed on the first data to produce first logarithmic data. Step 502 may be implemented with steps 504–506. At step 504, a most-significant logarithmic function value is retrieved based on a portion of the first data. At step 505, a least-significant logarithmic function approximation is retrieved based on another portion of the first data. The most-significant logarithmic function value and the least-significant logarithmic function approximation are added to the first data at step 506 to produce the first logarithmic data.

At step 508, a second logarithmic approximation is performed on the second data to produce second logarithmic data. The steps 510–512 may be used to produce the second logarithmic data from the second data in the same manner that steps 504–506 were used to produce the first logarithmic data from the first data.

At step 514, the first and second logarithmic data are combined to produce a logarithmic resultant. The first and second logarithmic data may be combined using addition, subtraction, etc. At step 516, an inverse logarithmic approximation is performed on the logarithmic resultant to produce an arithmetic resultant. For example, if the first and second logarithmic data are combined using addition at step 514, the arithmetic resultant will approximate the product of multiplying the first and second data. If the second logarithmic data is subtracted from the first logarithmic data at step 514, the arithmetic resultant will approximate the quotient of dividing the first data by the second data.

Steps 518–520 may be used to perform the step 516. At step 518, a most-significant inverse logarithmic function value is retrieved based on at least a portion of the logarithmic resultant. At step 519, a least-significant inverse logarithmic function approximation is retrieved based on another portion of the logarithmic resultant. The most-significant inverse logarithmic function value and the least-significant inverse logarithmic function approximation are added to the logarithmic resultant at step 520 to produce the arithmetic resultant.

The present invention provides a method and apparatus for a digital signal processor having a multiplierless computation block. Prior-art DSP systems suffer when the majority of the processing power of the DSP core processor is consumed by computationally intensive routines. By offloading computationally intensive routines to a computation block or a co-processor designed to provide improved throughput for the computationally intensive routines, the DSP core processor can enter a low-power state, thus conserving power, or can be utilized for other tasks. The computation block is designed using logarithmic additions to perform multiplication functions, thus eliminating the need for a typical multiplier, which uses excessive die area.

I claim:

1. A co-processor comprising:
   a control block that controls data routing in the co-processor; and
   a computation block operably coupled to the control block, wherein the computation block includes:
   a first logarithmic encoder that performs a first logarithmic approximation on first data to produce first logarithmic data, wherein routing of the first data to the first logarithmic encoder is controlled by the control block;
   a second logarithmic encoder that performs a second logarithmic approximation on second data to produce second logarithmic data, wherein routing of the second data to the second logarithmic encoder is controlled by the control block;
   an arithmetic block that combines the first logarithmic data and the second logarithmic data to produce a resultant that approximates an arithmetic function performed on the first data and the second data; and
   a logarithmic inverter operably coupled to the arithmetic block, wherein the logarithmic inverter performs an inverse-logarithmic approximation on the resultant.

2. The co-processor of claim 1, wherein the first logarithmic encoder comprises:
   a first memory that stores most-significant logarithmic function values, wherein one of the most-significant logarithmic function values is addressed by at least a first portion of the first data;

a second memory that stores least-significant logarithmic function approximations, wherein one of the least-significant logarithmic function approximations is addressed by at least a second portion of the first data; and an adder, wherein the adder combines the one of the most significant logarithmic function values and the one of the least-significant logarithmic function approximations.

3. The co-processor of claim 2, wherein the adder further comprises an input coupled to receive the first data, wherein the first data is added to the one of the most significant logarithmic function values and the one of the least-significant logarithmic function approximations to produce the first logarithmic data.

4. The co-processor of claim 1, wherein the second logarithmic encoder comprises:

a first memory that stores most-significant logarithmic function values, wherein one of the most-significant logarithmic function values is addressed by at least a first portion of the second data;

a second memory that stores least-significant logarithmic function approximations, wherein one of the least-significant logarithmic function approximations is addressed by at least a second portion of the second data; and an adder, wherein the adder combines the one of the most significant logarithmic function values and the one of the least-significant logarithmic function approximations.

5. The co-processor of claim 4, wherein the adder further comprises an input coupled to receive the second data, wherein the second data is added to the one of the most significant logarithmic function values and the one of the least-significant logarithmic function approximations to produce the second logarithmic data.

6. The co-processor of claim 1, wherein the logarithmic inverter comprises:

a first memory that stores most-significant inverse logarithmic function values, wherein one of the most-significant inverse logarithmic function values is addressed by at least a first portion of the resultant;

a second memory that stores least-significant inverse logarithmic function approximations, wherein one of the least-significant inverse logarithmic function approximations is addressed by at least a second portion of the resultant; and an adder, wherein the adder combines the one of the most significant inverse logarithmic function values and the one of the least-significant inverse logarithmic function approximations.

7. The co-processor of claim 6, wherein the adder further comprises an input coupled to receive the resultant, wherein the resultant is added to the one of the most significant inverse logarithmic function values and the one of the least-significant inverse logarithmic function approximations to produce to produce a logarithmic inversion product.

8. The co-processor of claim 7, wherein the logarithmic inverter further comprises an accumulator, wherein the accumulator adds the logarithmic inversion product to an accumulated value.

9. The co-processor of claim 1, wherein the control block further comprises control circuitry, wherein the control circuitry specifies the arithmetic function.

10. The co-processor of claim 1 further comprises a first shift register operably coupled to the first logarithmic encoder and the arithmetic block, wherein the first shift register performs, under control of the control block, bit-wise shifts on the first logarithmic data.

11. The co-processor of claim 1 further comprises a second shift register operably coupled to the second logarithmic encoder and the arithmetic block, wherein the second shift register performs, under control of the control block, bit-wise shifts on the second logarithmic data.

12. The co-processor of claim 1, wherein the control block further comprises a finite state machine for audio processing.

13. The co-processor of claim 1, wherein the control block further comprises a processor, wherein the processor executes audio processing microcode stored in memory, wherein the audio processing microcode at least includes lag-search pitch-prediction microcode.

14. A digital signal processor comprising:

a program controller, wherein the program controller produces a plurality of control signals to control execution of an algorithm;

an address generation unit operably coupled to the program controller, wherein the address generation unit generates address signals based on at least a first one of the plurality of control signals, wherein the address signals are used to retrieve a first data and a second data; and a multiplierless computation block operably coupled to the program controller, wherein the multiplierless computation block includes:

a first logarithmic encoder that performs a first logarithmic approximation on the first data to produce first logarithmic data;

a second logarithmic encoder that performs a second logarithmic approximation on the second data to produce second logarithmic data;

an arithmetic block that combines, based on at least a second one of the control signals, the first logarithmic data and the second logarithmic data to produce a resultant that approximates an arithmetic function performed on the first data and the second data; and a logarithmic inverter operably coupled to the arithmetic block, wherein the logarithmic inverter performs an inverse-logarithmic approximation on the resultant.

15. The digital signal processor of claim 14, wherein the first logarithmic encoder comprises:

a first memory that stores most-significant logarithmic function values, wherein one of the most-significant logarithmic function values is addressed by at least a first portion of the first data;

a second memory that stores least-significant logarithmic function approximations, wherein one of the least-significant logarithmic function approximations is addressed by at least a second portion of the first data; and an adder, wherein the adder combines the one of the most significant logarithmic function values and the one of the least-significant logarithmic function approximations.

16. The digital signal processor of claim 15, wherein the adder further comprises an input coupled to receive the first data, wherein the first data is added to the one of the most significant logarithmic function values and the one of the least-significant logarithmic function approximations to produce the first logarithmic data.

17. The digital signal processor of claim 14, wherein the second logarithmic encoder comprises:
- a first memory that stores most-significant logarithmic function values, wherein one of the most-significant logarithmic function values is addressed by at least a first portion of the second data;
- a second memory that stores least-significant logarithmic function approximations, wherein one of the least-significant logarithmic function approximations is addressed by at least a second portion of the second data; and
- an adder, wherein the adder combines the one of the most significant logarithmic function values and the one of the least-significant logarithmic function approximations.

18. The digital signal processor of claim 17, wherein the adder further comprises an input coupled to receive the second data, wherein the second data is added to the one of the most significant logarithmic function values and the one of the least-significant logarithmic function approximations to produce the second logarithmic data.

19. The digital signal processor of claim 14, wherein the logarithmic inverter comprises:
- a first memory that stores most-significant inverse logarithmic function values, wherein one of the most-significant inverse logarithmic function values is addressed by at least a first portion of the resultant;
- a second memory that stores least-significant inverse logarithmic function approximations, wherein one of the least-significant inverse logarithmic function approximations is addressed by at least a second portion of the resultant; and
- an adder, wherein the adder combines the one of the most significant inverse logarithmic function values and the one of the least-significant inverse logarithmic function approximations.

20. The digital signal processor of claim 19, wherein the adder further comprises an input coupled to receive the resultant, wherein the resultant is added to the one of the most significant inverse logarithmic function values and the one of the least-significant inverse logarithmic function approximations to produce a logarithmic inversion product.

21. The digital signal processor of claim 20, wherein the logarithmic inverter further comprises an accumulator, wherein the accumulator adds the logarithmic inversion product to an accumulated value.

22. The digital signal processor of claim 14, wherein the arithmetic block further comprises at least one control input coupled to at least one of the plurality of control signals such that the arithmetic function is determined by the at least one of the plurality of control signals.

23. The digital signal processor of claim 14 further comprises a first shift register operably coupled to the first logarithmic encoder, wherein the first shift register performs bit-wise shifts on the first logarithmic data.

24. The digital signal processor of claim 14 further comprises a second shift register operably coupled to the second logarithmic encoder, wherein the second shift register performs bit-wise shifts on the second logarithmic data.

25. A co-processor comprising:
- memory that stores most-significant logarithmic function values, least-significant logarithmic function approximations, most-significant inverse logarithmic function values, and least-significant inverse logarithmic function approximations, wherein the most-significant logarithmic function values and the least-significant logarithmic function approximations approximate values on a logarithmic error curve, and the most-significant inverse logarithmic function values and the least-significant inverse logarithmic function approximations approximate values on an inverse-logarithmic error curve;
- a logarithmic function block operably coupled to the memory, wherein the logarithmic function block generates at least a first address based on first data, wherein the at least a first address addresses a first one of the most-significant logarithmic function values and a first one of the least-significant logarithmic function approximations, and wherein the logarithmic function block generates at least a second address based on second data, wherein the at least a second address addresses a second one of the most-significant logarithmic function values and a second one of the least-significant logarithmic function approximations;
- wherein the logarithmic function block processes the first data, the second data, the first one of the most-significant logarithmic function values, the first one of the least-significant logarithmic function approximations, the second one of the most-significant logarithmic function values, and the second one of the least-significant logarithmic function approximations to perform a arithmetic function thereby producing a resultant; and
- wherein the logarithmic function block generates, based on the resultant, at least a third address for an inverse logarithmic function, wherein the third address addresses one of the most-significant inverse logarithmic function values and one of the least-significant inverse logarithmic function approximations, and wherein the logarithmic function block processes the resultant, the one of the most-significant inverse logarithmic function values, and the one of the least-significant inverse logarithmic function approximations to produce the inverse logarithmic function of the resultant.

26. The co-processor of claim 25, wherein the logarithmic function block further comprises an address generation block, wherein the address generation block receives the first data, the second data, and the resultant, and wherein the address generation block generates the at least a first address, the at least a second address, and the at least a third address based on the first data, the second data, and the resultant, respectively.

27. The co-processor of claim 25, wherein the logarithmic function block further comprises an adder, wherein the adder combines the first data, the second data, the first one of the most-significant logarithmic function values, the first one of the least-significant logarithmic function approximations, the second one of the most-significant logarithmic function values, and the second one of the least-significant logarithmic function approximations to produce the resultant.

28. The co-processor of claim 25, wherein the logarithmic function block further comprises an adder, wherein the adder combines the resultant, the one of the most-significant inverse logarithmic function values, and the one of the least-significant inverse logarithmic function approximations to produce the inverse logarithmic function.

* * * * *